(12) United States Patent
Silverman et al.

(10) Patent No.: US 11,063,675 B2
(45) Date of Patent: Jul. 13, 2021

(54) WIRELESS SPECTRUM MANAGEMENT AND OPTIMIZATION FOR DUAL TRANSCEIVER OPERATION

(71) Applicant: Cisco Technology, Inc., San Jose, CA (US)

(72) Inventors: Matthew Aaron Silverman, Shaker Heights, OH (US); Pooya Monajemi, Irvine, CA (US); Vishal Satyendra Desai, San Jose, CA (US); John Martin Blosco, Norton, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 181 days.

(21) Appl. No.: 16/292,962

(22) Filed: Mar. 5, 2019

(65) Prior Publication Data
US 2020/0287633 A1 Sep. 10, 2020

(51) Int. Cl.
*H04B 15/00* (2006.01)
*H04B 17/318* (2015.01)
*H04B 1/38* (2015.01)

(52) U.S. Cl.
CPC .......... *H04B 15/00* (2013.01); *H04B 1/38* (2013.01); *H04B 17/318* (2015.01)

(58) Field of Classification Search
CPC ........ H04B 15/00; H04B 17/318; H04B 1/38; H04W 72/085
See application file for complete search history.

(56) References Cited

U.S. PATENT DOCUMENTS

| | | | | |
|---|---|---|---|---|
| 4,794,635 A | * | 12/1988 | Hess | H04W 72/085 455/513 |
| 5,109,529 A | * | 4/1992 | Akaiwa | H04W 72/085 455/513 |
| 5,148,548 A | * | 9/1992 | Meche | H04W 72/082 455/296 |

(Continued)

FOREIGN PATENT DOCUMENTS

CN 108668375 A 10/2018

OTHER PUBLICATIONS

Kaidong Wang et al., "Scheduling and Resource Allocation in 802.11ax", DOI: 10.1109/INFOCOM.2018.8486204, Conference: IEEE INFOCOM 2018—IEEE Conference on Computer Communications, Apr. 1, 2018, 9 pages.

(Continued)

*Primary Examiner* — Lewis G West
(74) *Attorney, Agent, or Firm* — Edell, Shapiro & Finnan, LLC

(57) ABSTRACT

An access point allocates resource units within a first channel to mitigate interference from an adjacent second channel. The access point obtains a measure of signal strength corresponding to each wireless device attached to an access point, and assigns, for each wireless device, resource units with a first frequency band of the first channel to mitigate interference with a second frequency band of a second channel adjacent to the first channel. An assignment between a set of resource units and a particular wireless device is based on the measure of signal strength corresponding to the particular wireless device. The access point communicates with the wireless devices on the resource units.

20 Claims, 7 Drawing Sheets

(56) References Cited

U.S. PATENT DOCUMENTS

| | | | | |
|---|---|---|---|---|
| 5,203,012 A * | 4/1993 | Patsiokas | ............ | H04M 1/72511 455/513 |
| 5,448,750 A * | 9/1995 | Eriksson | ............... | H04W 16/04 455/452.2 |
| 5,579,373 A * | 11/1996 | Jang | ...................... | H04W 16/02 455/436 |
| 5,774,785 A * | 6/1998 | Karlsson | .............. | H04B 17/309 455/522 |
| 5,809,399 A * | 9/1998 | Tuutijarvi | ............ | H04B 1/1036 455/266 |
| 5,862,476 A * | 1/1999 | Hasegawa | ......... | H04W 52/0245 455/432.2 |
| 5,963,865 A * | 10/1999 | Desgagne | ........... | H04W 72/082 370/329 |
| 6,985,733 B2 * | 1/2006 | Binzel | ................... | H04W 36/30 455/437 |
| 9,763,117 B2 | 9/2017 | Amini et al. | | |
| 10,015,791 B2 | 7/2018 | Akhavan-Saraf et al. | | |
| 10,111,206 B2 | 10/2018 | Desai et al. | | |
| 10,845,481 B2 * | 11/2020 | Pierce | ................... | G01S 7/4816 |
| 2002/0102941 A1 * | 8/2002 | Kuiri | ................... | H04B 17/382 455/67.11 |
| 2002/0111158 A1 * | 8/2002 | Tee | ....................... | H04W 36/18 455/421 |
| 2006/0035592 A1 * | 2/2006 | Park | ....................... | H04B 17/21 455/67.11 |
| 2007/0149230 A1 * | 6/2007 | Song | ..................... | H04W 72/02 455/515 |
| 2009/0197554 A1 * | 8/2009 | Shi | ........................ | H04B 1/1036 455/226.2 |
| 2013/0343241 A1 * | 12/2013 | Niu | ....................... | H04L 1/0038 370/280 |
| 2014/0192669 A1 * | 7/2014 | Wang | ................... | H04B 17/318 370/252 |
| 2015/0139073 A1 * | 5/2015 | Buchwald | ............. | H04W 84/08 370/327 |
| 2015/0146627 A1 * | 5/2015 | Ananda | ................. | H04W 8/005 370/329 |
| 2017/0207866 A1 * | 7/2017 | Fujita | .................... | H04W 24/08 |
| 2018/0213427 A1 * | 7/2018 | Uemura | ................ | H04W 24/10 |
| 2019/0013923 A1 * | 1/2019 | Liu | ........................ | H04B 1/525 |
| 2020/0029295 A1 * | 1/2020 | Srinivasan | ............. | H04B 17/27 |
| 2020/0349781 A1 * | 11/2020 | Warrier | .............. | G07C 9/00309 |

OTHER PUBLICATIONS

Eduardo Castañeda et al., "An Overview on Resource Allocation Techniques for Multi-User MIMO Systems", arXiv:1611.04645v1 [cs.IT], Nov. 14, 2016, 45 pages.

Keith McIntyre, "Suffering From Wi-Fi Congestion? Dual 5 GHz Radios Can Help", Jul. 20, 2016, 7 pages.

Cisco, "IEEE 802.11ax: The Sixth Generation of Wi-Fi", C11-740788-02 06/18, downloaded Dec. 4, 2018, https://www.cisco.com/c/dam/en/us/products/collateral/wireless/white-paper-c11-740788.pdf, 15 pages.

* cited by examiner

WIRELESS SPECTRUM MANAGEMENT AND OPTIMIZATION FOR DUAL TRANSCEIVER OPERATION

TECHNICAL FIELD

The present disclosure relates to mitigating interference between co-located wireless transceivers.

BACKGROUND

In wireless networks, access points may use two radios to double the number of wireless devices that connect to the wireless network via the access point. The access point attempts to minimize the interference between the two co-located radios using constraints on how close together channels are allowed to operate in the two radios. Adjacent channels suffer from a degraded noise floor. For instance, dual 5 GHz wireless networks typically ensure that adjacent channels are separated by at least 100 MHz due to the issues with adjacent channel interference.

DESCRIPTION OF EXAMPLE EMBODIMENTS

Overview

Figure 1:
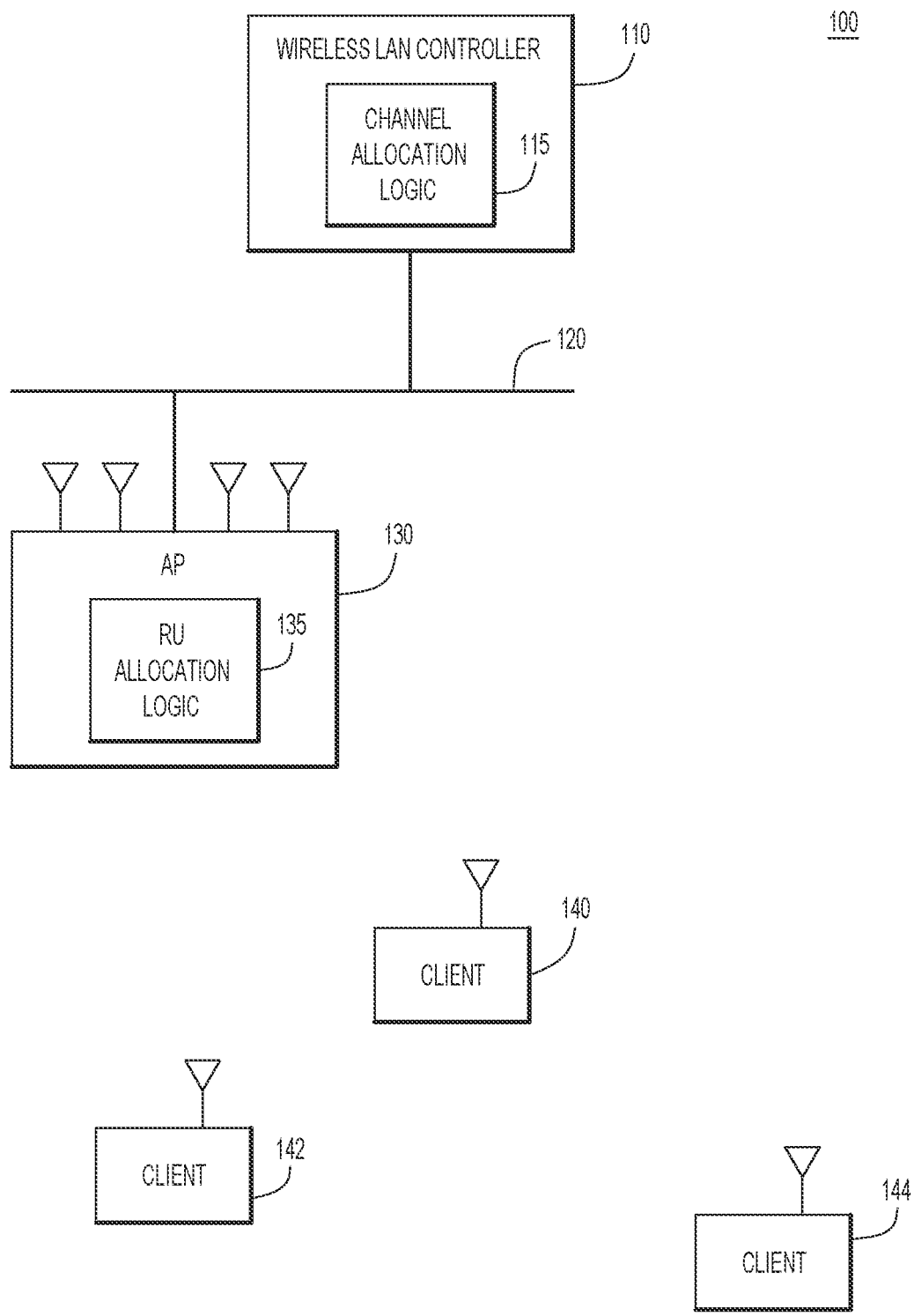
FIG. 1 is a system diagram of an access point and controller that allocate radio resources to mitigate interference between adjacent channels of co-located radios, according to an example embodiment.

The techniques presented herein provide for a method of allocating resource units within a first channel to mitigate interference from an adjacent second channel. The method includes obtaining a measure of signal strength corresponding to each wireless device of a plurality of wireless devices attached to an access point. The method also includes assigning, for each wireless device, resource units with a first frequency band of the first channel to mitigate interference with a second frequency band of a second channel adjacent to the first channel. An assignment between a set of resource units and a particular wireless device is based on the measure of signal strength corresponding to the particular wireless device. The method further includes communicating with the plurality of wireless devices on the resource units.

Example Embodiments

Wireless networks with co-located radios may experience interference due to signals from one channel bleeding into a signal from an adjacent channel. Spacing the channels of the wireless network sufficiently apart in frequency may allow an access point to minimize interference between adjacent channels, but also limits the bandwidth available for transmitting and receiving signals with wireless devices. The techniques presented herein enable an access point to mitigate interference from an adjacent channel by assigning Resource Units (RUs) within a channel selectively to different wireless devices. In this way, the stronger connections are allocated RUs that are near the potentially interfering adjacent channel, while the weaker connections are allocated RUs further from the adjacent channel.

An access point may allocate RUs on the uplink (i.e., with the access point receiving data) to create a more even distribution across wireless client devices of signal-to-interference ration (SIR) by taking into consideration the receiving baseband (BB) filter roll-off across the frequency band of the channel and the signal strength received by each wireless client device. In one example, the allocation of uplink RUs may be mixed with uplink power control per RU to make a tradeoff between SIR per RU, spectral flatness, and Analog-to-Digital Converter (ADC) dynamic range. Additionally, the access point may allocate RUs on the downlink (i.e., with the access point transmitting data) so that high signal-to-noise ratio (SNR) client devices are assigned to the edge frequencies of the channel, enabling the transmission power to be reduced (e.g., through an adjusted baseband filter) for signals to the high SNR devices. The reduction in transmission power reduces any interference with an adjacent channel.

In addition to access points allocating RUs within the frequency band of a channel to mitigate interference from adjacent channels, the techniques presented herein enable a controller of a wireless network to adjust the properties of the channels. In particular, the controller may select center frequencies of channels that are closer to each other, while maintaining a safe separation between primary frequencies of the channels.

Additionally, the controller may select bandwidth values that extend the edge frequencies closer to each other. The controller may selecting bandwidth values that extend the edge frequencies based on the amount of traffic that is utilizing the full bandwidth instead of only utilizing a shorter portion of the entire bandwidth. The controller may also select bandwidth values based on the amount of traffic that is Orthogonal Frequency-Division Multiple Access (OFDMA) trigger-based or contention based. Further, the controller may select bandwidth values based on the signal strength (e.g., Received Signal Strength Indicator (RSSI)) of client devices that operate in a scheduled mode or in a contention mode. For instance, legacy wireless networks (e.g., Wi-Fi predating the IEEE 802.11ax standard) is inherently unscheduled, the controller may direct the access point to announce a shorter bandwidth for legacy clients, while using the near-edge RUs in OFDMA mode exclusively for modern client devices.

Referring now to FIG. 1, a wireless network system 100 is configured to allocate radio resources to minimize interference between adjacent channels in co-located radios. The system 100 includes a wireless Local Area network (LAN) controller 110 with channel allocation logic 115. The channel allocation logic 115 enables the wireless LAN controller 110 to adjust the channels (e.g., bandwidth or frequencies) to better utilize the radio resources in the wireless network.

The wireless LAN controller 110 communicates with one or more access points through a network 120 (e.g., a LAN), which may also include connections to other networks (e.g., Wide Area Networks, internet, intranet, etc.). The system 100 also includes an access point (AP) 130 that is configured to connect wireless devices to the LAN 120. The AP 130 includes Resource Unit (RU) Allocation Logic 135 to determine which radio resources are allocated to each wireless client device attached to the AP 130. The system 100 may include wireless client devices 140, 142, and 144, which connect to the AP 130 according to the resources allocated by the AP 130.

The connections between each wireless client device 140, 142, and 144 to the AP 130 may vary in signal quality (e.g., SNR) and/or signal strength (e.g., RSSI) due to various environmental or systemic factors. For instance, a wireless client device that is further away from the AP 130 (e.g., device 144) may transmit a signal that is received with a lower signal strength than a signal that is transmitted from a closer wireless client device (e.g., device 140). The AP 130 is configured to allocate RUs to each connection with a wireless client device 140, 142, or 144 in order to ensure that signals between the wireless client devices 140, 142, and 144 and the AP 130 are more likely to be received, despite any interference from a co-located radio operating on an adjacent channel.

Figure 2:
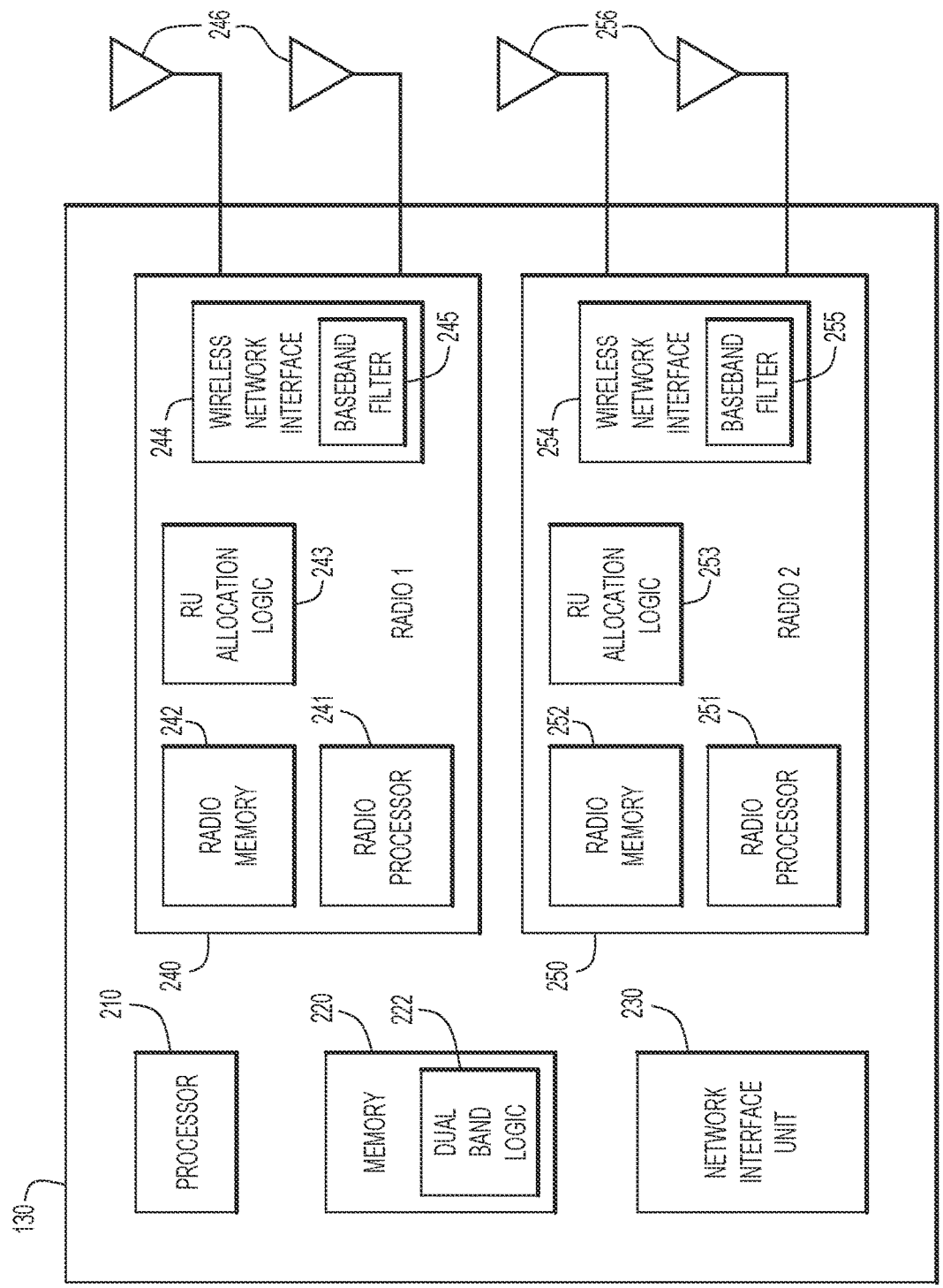
FIG. 2 is a simplified block diagram of an access point that is configured to allocate radio resources according to an example embodiment.

Referring now to FIG. 2, an example block diagram of a dual band AP 130 is shown. The AP 130 includes, among other possible components, a processor 210 to process instructions relevant to providing access to wireless network (e.g., allocating RUs), and a memory 220 to store a variety of data and software instructions (e.g., dual band logic 222). The AP 130 also includes a network interface unit 230 to communicate with computing devices (e.g., controller 110) and/or computer networks (e.g., LAN 120).

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

The AP 130 also includes a first radio 240 comprising a processor 241, a memory 242, RU allocation logic 243, a wireless network interface 244 with a baseband filter 245, and a set of antennas 246. The processor 241 may be a Reduced Instruction Set Computing (RISC) processor that executes instructions for implementing the processes described herein. The memory 242 is a memory device dedicated to the operations of the radio 240, and may be a dynamic RAM device. The RU allocation logic 243 is at least a portion of the RU allocation logic 135, as described in FIG. 1, which is configured to determine which radio resources are allocated to each wireless client device attached to the AP 130 via the radio 240. In one example, the RU allocation logic 243 may allocate OFDMA RUs to each wireless client device. The wireless network interface 244 is configured to send and receive signals in support of different bands and/or channels in wireless computer networks. The baseband filter 245 is tunable to limit transmission to frequencies within a specific wireless channel. The antennas 246 include one or more antennas configured to transmit and receive wireless signals to and from wireless client devices.

The AP 130 further includes a second radio 250 comprising a processor 251, a memory 252, RU allocation logic 253, a wireless network interface 254 with a baseband filter 255, and a set of antennas 256, each of which are configured to perform analogous functions as corresponding components in the first radio 240. The AP 130 uses the first radio 240 and the second radio 250 to transmit and receive wireless signals simultaneously. Tuning the co-located first radio 240 and second radio 250 to adjacent channels in the wireless network may cause the transmitted signals from one radio to interfere with the received signals on the other radio.

Figure 3:
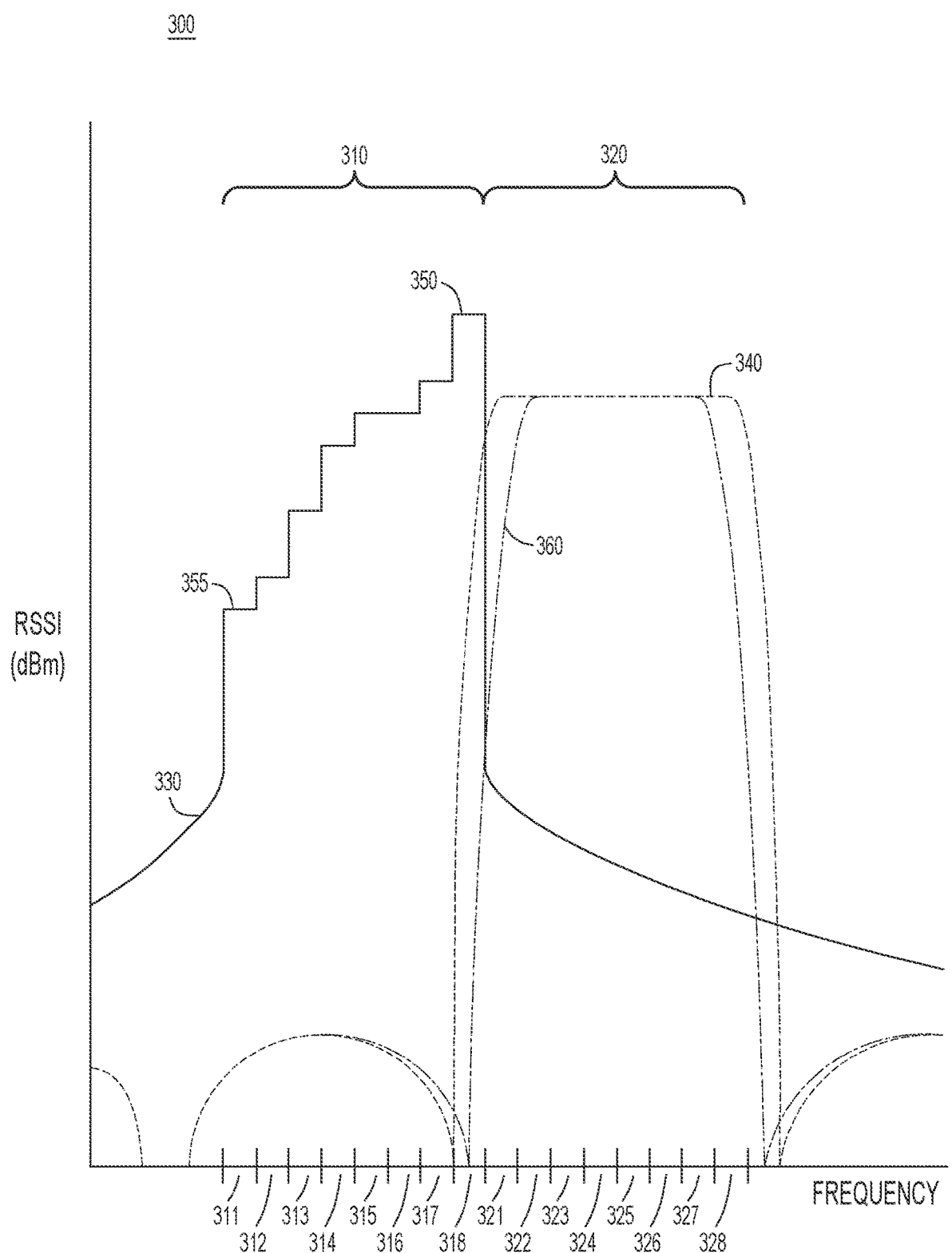
FIG. 3 is a graph illustrating the allocation of uplink and downlink transmissions, according to an example embodiment.

Referring now to FIG. 3, a graph 300 illustrates the strength of potentially interfering signals in an access point (e.g., AP 130) after allocating RUs to the uplink communications according to the techniques presented herein. The graph 300 shows the signal strength (i.e., RSSI) of two adjacent channels across the frequency bands of the channels. For simplicity, the first channel 310 includes eight RUs 311-318, and the second channel 320 includes eight RUs 321-328. The RU 318 of the first channel 310 is adjacent to the RU 321 of the second channel 320. The signal 330 represents the uplink signals (i.e., signals from wireless client devices to the access point) that are received at the access point, and falls off significantly outside of the channel 310. The signal 340 represents the downlink signals (i.e., signals from the access point to the wireless client devices) that are transmitted from the access point. While the transmitted signal 340 loses significant strength outside of the channel 320 due to the baseband filtering, the strength of the transmitted signal 340 remains significant in the RU 318 of the adjacent channel 310.

To mitigate the interference from the transmitted signal 340 with the received signal 330, the access point allocates the RU 318 to a wireless client device that contributes the highest signal strength 350 to the received signal 330. The access point also allocates the RU 311, which is furthest from the second channel 320, to the wireless client device that contributes the lowest signal strength 355 to the received signal 330. By allocating the strongest signals (e.g., from the closest wireless client devices) to the RUs that may experience the most interference from the adjacent channel, the access point mitigates the interference from the adjacent channel.

To further reduce the interference of the downlink channel 320 on the uplink channel 310, the access point may reduce the transmission power of the second channel 320. For instance, the baseband filter of the radio transmitting the second channel 320 may be adjusted to cause the transmission power to fall off further from the edge of the channel 320. The signal 360 represents the downlink signals after the access point has reduced the transmission power at the edges of the channel 320. To ensure that the downlink signals on the edges of the channel 320 (i.e., RU 321 and 328) are received, the RUs on the edge of the second channel are allocated to wireless client devices that have reported a strong connection (e.g., a high RSSI). Since the wireless client devices with the highest signal strength are best able to receive a weaker signal, lowering the transmission power does not significantly affect the reception of the downlink transmissions.

The graph 300 of FIG. 3 shows a simplified version of the signals and RUs in a wireless network to illustrate an example of how the access point allocates RUs to mitigate interference from co-located radios tuned to adjacent channels. More realistic wireless networks may include significantly more RUs per channel, and may assign multiple RUs to a single wireless client device.

Figure 4:
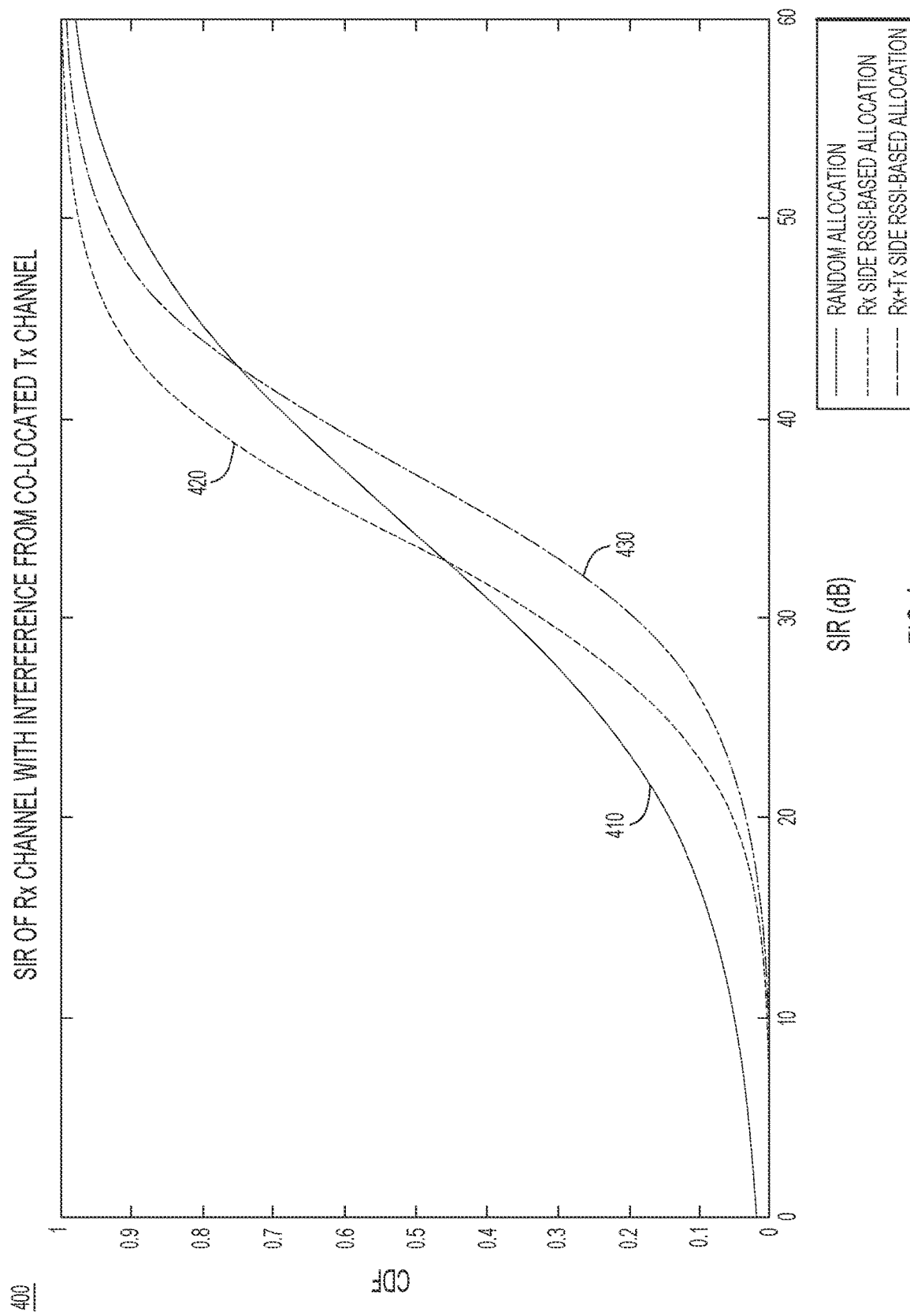
FIG. 4 is a graph illustrating the shift in signal quality for allocating resource units for uplink and downlink transmissions, according to an example embodiment.

Referring now to FIG. 4, a graph 400 illustrates the improvement of the overall signal quality due to the techniques presented herein. The graph 400 presents the cumulative distribution function (CDF) of Signal-to-Interference Ratio (SIR) of an uplink channel with interference from an adjacent downlink channel. Each line shows the probability that a wireless client device randomly selected from the devices attached to the access point will experience a particular SIR. Alternatively, each line may be considered to show the percentage of the wireless client devices that will experience each particular SIR. Line 410 shows the SIR distribution for an access point that randomly allocates RUs to wireless client devices. Line 420 shows the SIR distribution for an access point that allocates uplink RUs to wireless client devices based on the signal strength associated with the wireless client device. Line 430 shows the SIR distribution for an access point that allocates both uplink RUs and downlink RUs to wireless client devices based on the signal strength associated with the wireless client devices.

The randomly allocated wireless client devices represented by the distribution 410 include a significant number of devices with poor SIR (e.g., <10-20 dB), but also a significant number of devices with very good SIR (e.g., >50 dB). By allocating the uplink RUs to wireless client devices based on the signal strength, as described herein, the distribution 420 includes far fewer devices with poor SIR at the expense of fewer devices with very good SIR, and clusters most of the devices (e.g., approximately 85% of the devices) in the acceptable range of SIR (e.g., 20-40 dB). In other words, allocating uplink RUs based on signal strength essentially shifts SIR from devices that have more than adequate SIR to devices that have unacceptably low SIR. Additionally, allocating downlink RUs based on signal strength and lowering the transmission power of the edge RUs allocated to the wireless client devices, as represented by the distribution 430, shifts the SIR for the uplink channels on all of the wireless client devices.

Figure 5:
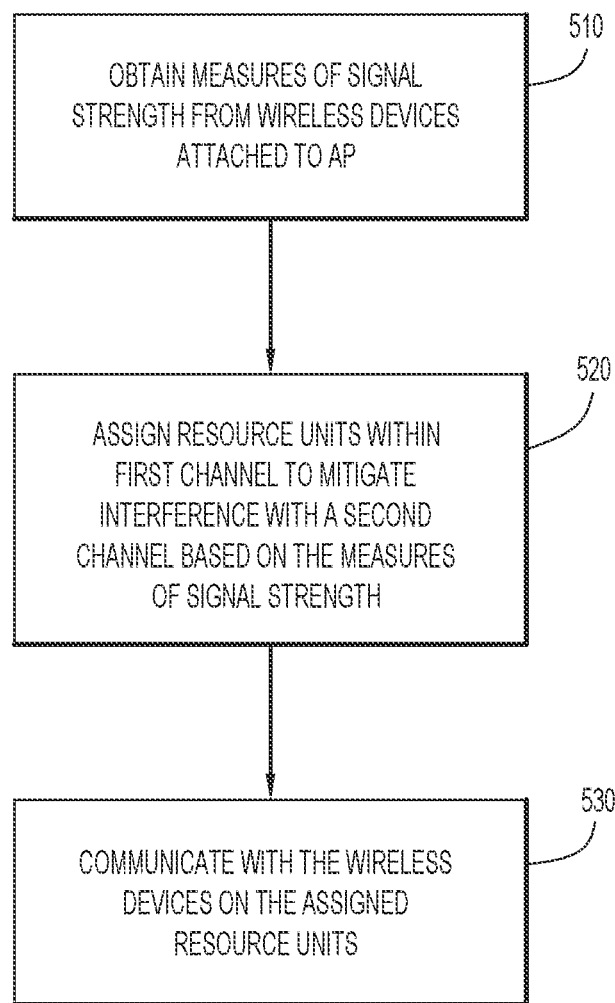
FIG. 5 is a flow chart illustrating operations performed by an access point in a process of allocating radio resources, according to an example embodiment.

Referring now to FIG. 5, a process 500 describes operations performed by an access point to allocate radio resources based to wireless devices based on their respective signal strength. At 510, the access point obtains a measure of signal strength corresponding to each wireless device of a plurality of wireless devices attached to the access point. In one example, the access point gathers RSSI data from each of the wireless devices as the measure of the signal strength corresponding to that wireless device. At 520, the access point assigns resource units within a first frequency band of a first channel to each of the wireless devices. The access point assigns the resource units to mitigate interference with a second frequency band of a second channel that is adjacent to the first channel. Each particular wireless device is assigned resource units in the first frequency band based on the measure of signal strength corresponding to that particular wireless device.

At 530, the access point communicates with plurality of wireless devices on the assigned resource units. In one example, the first channel is an uplink channel to the access point, and the access point allocates resource units in the first frequency band that are closest to the second frequency band to a wireless device with the highest corresponding measure of signal strength. Communicating with the wireless devices may comprise sending an OFDMA trigger frame that schedules the resource units for at least some of the wireless devices, and waiting for the scheduled time slot to receive transmissions from the wireless devices on the allocated resource units. Alternatively, the first channel may be a downlink channel, and the access point allocates resource units on the edges of the first frequency band to wireless devices with the highest corresponding measure of signal strength. Communicating with the wireless devices may comprise adjusting a baseband filter to lower the transmission power in the edge resource units, and transmitting data to the wireless devices on the allocated resource units.

Figure 6:
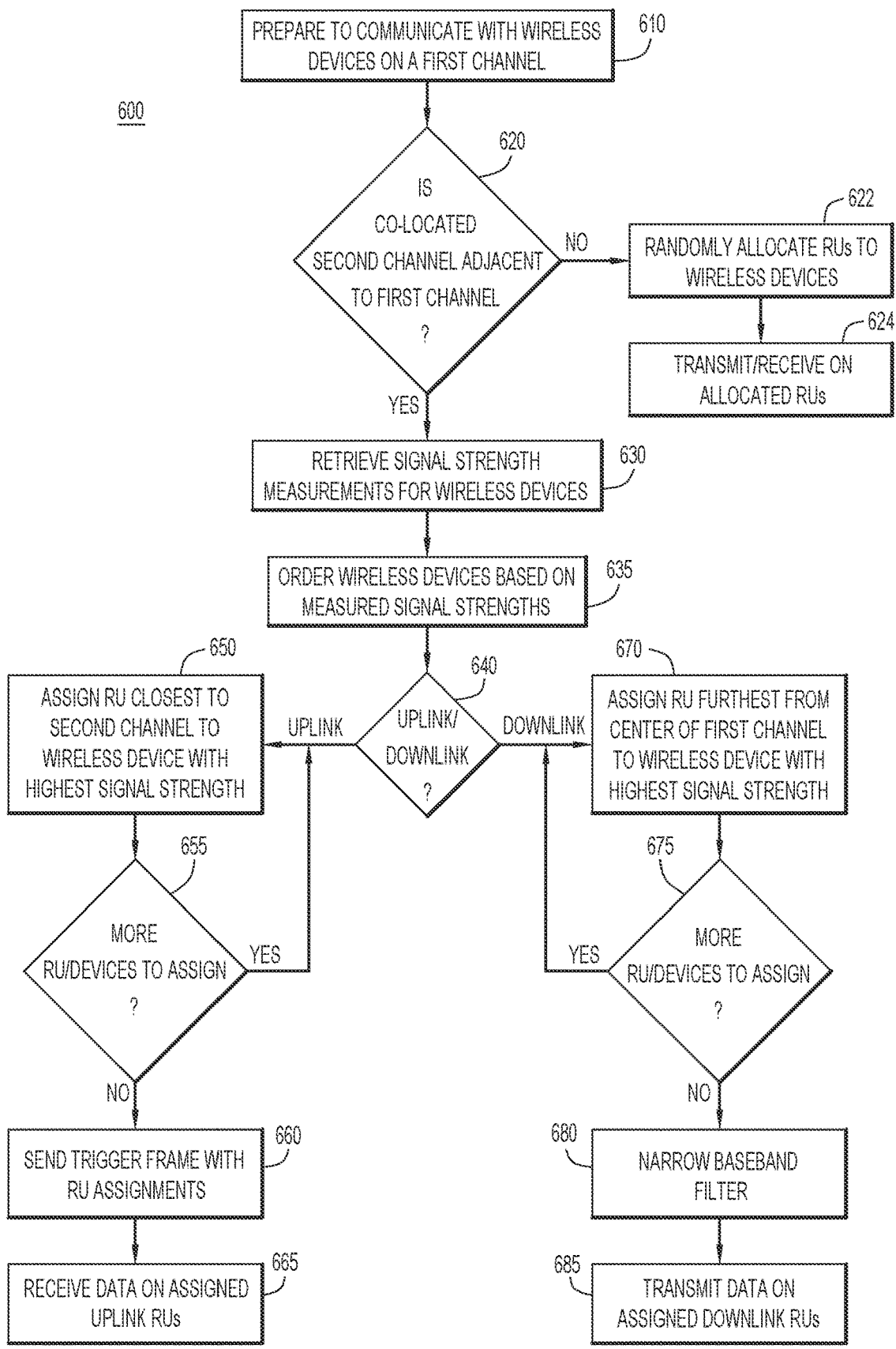
FIG. 6 is a flow chart illustrating operations performed by an access point to transfer data with a wireless device, according to an example embodiment.

Referring now to FIG. 6, an example process 600 shows the operations of an access point to allocate radio resources based to wireless devices based on their respective signal strength. At 610, the access point prepares to communicate with wireless devices on a first channel. In one example, the access point may receive data to transmit to the wireless devices. Alternatively, the access point may receive a notification that the wireless devices have data to transmit to the access point.

At 620, the access point determines whether there is a co-located second channel that is adjacent to the first channel. In one example, the access point may have another radio that is tuned to the second channel adjacent to the first channel. If there is no adjacent second channel, then the access point randomly allocates RUs within the second channel to each of the wireless devices at 622. At 624, the access point communicates with the wireless devices on the allocated RUs. In one example, the access point may transmit data to the wireless devices or receive data from the wireless devices on the randomly allocated RUs.

If the access point determines that the frequencies of a co-located second channel are adjacent to the frequencies of the first channel, then the access point mitigates the interference from the second channel. At 630, the access point retrieves signal strength measurements for the wireless devices. In one example, the access point stores a database of RSSI measurements associated with each wireless device connected to the access point, and the access point retrieves the associated RSSI measurement for each wireless device from the database. Additionally, the access point may update the stored RSSI value for each wireless device when the access point receives a transmission from the wireless device. At 635, the access point orders the wireless devices based on the corresponding measures of signal strength. In one example, the access point sorts the wireless devices in descending order from the wireless device with the highest signal strength to the wireless device with the lowest signal strength. Alternatively, the access point may sort the wireless device in ascending order of signal strength.

At 640, the access point determines if the first channel is to be used as an uplink channel (i.e., receiving data from the wireless devices) or as a downlink channel (i.e., transmitting data to the wireless devices). If the first channel is an uplink channel, the access point assigns the RU in the first channel that is closest to the second channel to the wireless device with the highest measure of signal strength at 650. In one example, the access point uses a list of wireless devices sorted in order of signal strength to select the wireless device with the highest measure of signal strength. If there are more wireless devices and RUs to allocate, as determined at 655, the access point selects the wireless device with the next highest signal strength and assigns the RU closest to the second channel that have not previously been assigned. The access point continues to assign available RUs to the wireless devices with the highest signal strength until either no more RUs are available or no more wireless devices require RUs. In an alternative example, the access point may begin at 650 by assigning RUs furthest from the second channel to wireless devices with the lowest signal strength, and proceed up through the sorted list of wireless devices, assigning the next furthest RUs to the wireless device with the next lowest signal strength.

Once all available RUs have been assigned to wireless devices, and/or all of the wireless devices have been assigned RUs, the access point transmits a trigger frame at 660. In one example, the trigger frame includes the RU assignments for each of the wireless devices that will use the first channel as an uplink channel at a scheduled time slot. At 665, the access point receives data from the wireless devices that were assigned RUs.

If the first channel is determined to be a downlink channel at 640, then the access point assigns the RUs furthest from the center frequency of the first channel to the wireless device(s) with the highest signal strength at 670. In one example, the RUs further from the center frequency of the first channel (i.e., the edge frequency RUs) may be assigned to two different wireless devices. If there are more wireless devices and RUs to allocate, as determined at 675, the access point selects the wireless device with the next highest signal strength and assigns the RU closest to the edge of the first channel that have not previously been assigned. The access point continues to assign available RUs to the wireless devices with the highest signal strength until either no more RUs are available or no more wireless devices require RUs. In an alternative example, the access point may begin at 670 by assigning RUs closest to the center frequency of the first channel to the wireless device with the lowest signal strength, and proceed up through the sorted list of wireless devices, assigning the next closest RUs to the wireless device with the next lowest signal strength.

Once all available RUs have been assigned to wireless devices, and/or all of the wireless devices have been assigned RUs, the access point narrows the baseband filter at 680. Narrowing the baseband filter lowers the transmission power of the downlink signals in the first channel to lower interference with the adjacent second channel. At 685, the access point transmits data to the wireless devices on the assigned downlink RUs of the first channel. In one example, the access point may signal the wireless devices with the assigned RUs for each wireless device before transmitting in the downlink RUs.

Figure 7:
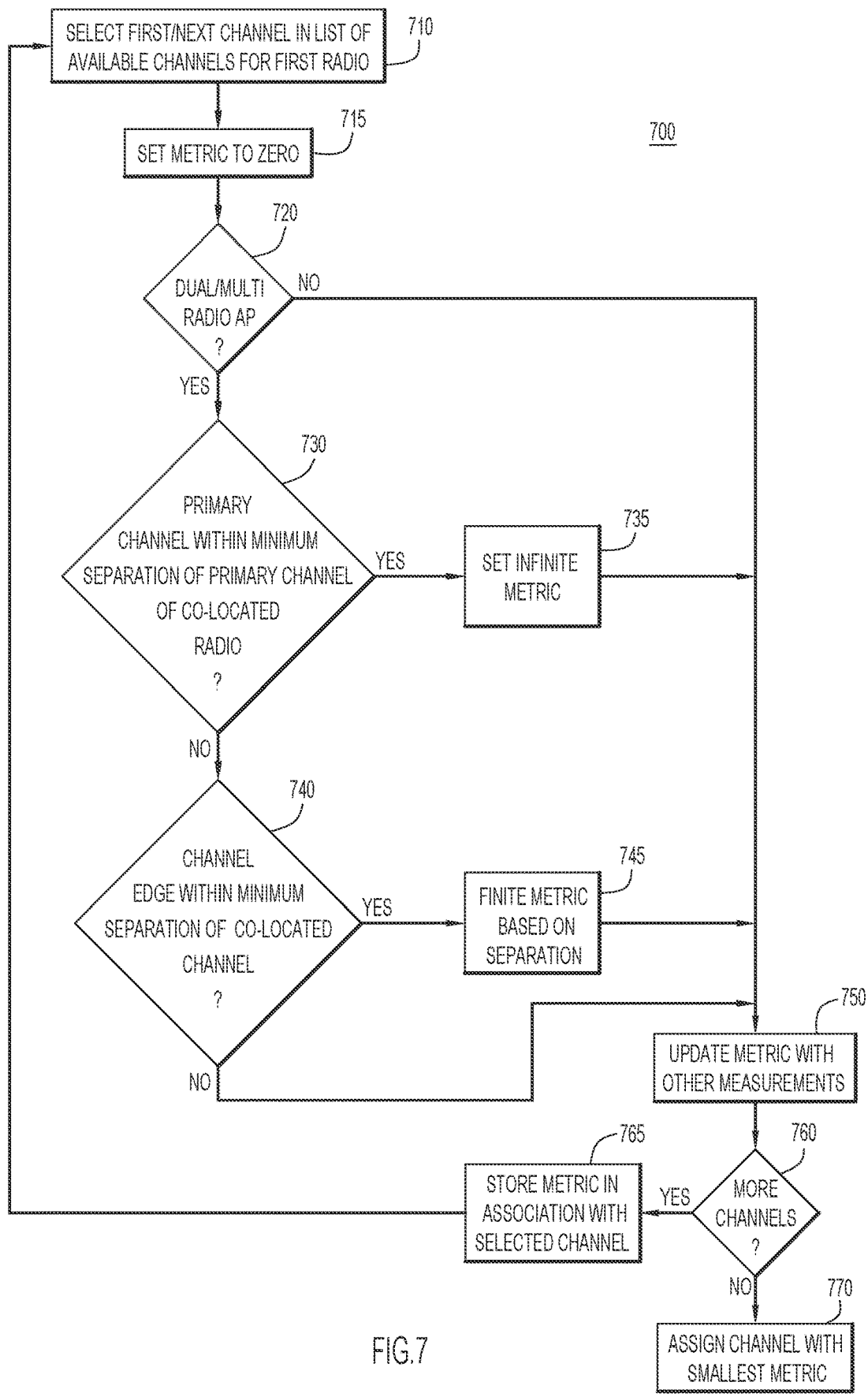
FIG. 7 is a flow chart illustrating operations by a wireless network controller to determine channels for an access point, according to an example embodiment.

Referring now to FIG. 7, an example process 700 shows the operations of wireless network controller to select channels for an access point that allocates RUs according to the techniques presented herein. At 710, the controller selects a channel from a list of available channels for a first radio in an access point, and sets a metric associated with the selected channel to zero at 715. At 720, the controller determines if the access point has more than one radio (e.g., a dual band AP) that may cause interference on the selected channel.

If the access point does have at least one co-located radio, then at 730 the controller determines whether the primary channel of the selected channel is within a predetermined minimum separation of the primary channel of the channel assigned to the co-located radio. In one example, the predetermined minimum separation may be large enough to ensure that no significant interference will occur between the primary channels of the radios (e.g., a 100 MHz separation for channels in the 5 GHz band). If the primary channels of the co-located radios are within the predetermined minimum separation, then the controller sets the metric associated with the selected channel to an infinite value (i.e., a value that is high enough to ensure the selected channel will not be assigned to the first radio) at 735.

If the primary channels of the co-located radios are not within the predetermined minimum separation, then the controller determines whether the edge of the selected channel is within the predetermined separation of the edge of the co-located radio channel at 740. If the edge of the selected channel is within the minimum separation of the edge of the co-located radio channel, then the controller sets the metric associated with the selected channel to a finite value based on the separation of the edges of the channels at 745.

After determining the metric for the selected channel based on the separation of the selected channel from a co-located radio channel, the controller may update the metric based on additional measurements at 750. In one example, once a channel or set of channels has been determined based on the spectrum isolation, the controller (or other central entity) may update the metric with, for instance, channel state information. The metric may also include Radio Frequency (RF) noise, Wi-Fi interference, non-Wi-Fi interference, presence of persistent wireless devices or noise wireless device, radar signals, alignment with neighboring wireless radios, and/or rogue access points.

If there are more available channels, as determined at 760, the controller stores the metric in association with the selected channel at 765 and selects the next available channel at 710. Once all of the available channels have been associated with a metric for the first radio, the controller assigns the channel that is associated with the smallest metric to the first radio at 770, and provides the assigned channel to the access point.

In summary, the techniques presented herein allocate resource units in uplink and/or downlink channels to mitigate interference between co-located radios that are assigned to adjacent channels. The allocation of resource units based on signal strength supports co-located, same band radio operation without expensive filtering. In contrast, Long Term Evolution (LTE) networks with scheduled transmissions require a more stringent standard with regard to spectrum and tend to focus on suing more expensive filtering, directional antenna sectoring, and power amplifier linearization. Additionally, the allocation of resource units described herein allows for smaller guard bands between adjacent frequencies, enabling wider bandwidth channels to support wireless devices with more of the available spectrum.

In one form, a method is provided for allocating resource units within a first channel to mitigate interference from an adjacent second channel. The method includes obtaining a measure of signal strength corresponding to each wireless device of a plurality of wireless devices attached to an access point. The method also includes assigning, for each wireless device, resource units with a first frequency band of the first channel to mitigate interference with a second frequency band of a second channel adjacent to the first channel. An assignment between a set of resource units and a particular wireless device is based on the measure of signal strength corresponding to the particular wireless device. The method further includes communicating with the plurality of wireless devices on the resource units.

As described above, the method may further include obtaining an indication that at least one wireless device has data to transmit to the access point on the first channel, and the operation of assigning resource units may comprise: ordering the plurality of wireless devices according to the measure of signal strength corresponding to each of the wireless devices; and assigning resource units within the first frequency band closest to the second frequency band in descending order such that a strongest wireless device with a highest corresponding measure of signal strength is assigned a first set of resource units closest to the second frequency band and a weakest wireless device with a lowest corresponding measure of signal strength is assigned to a second set of resource units further from the second frequency band.

The operation of communicating with the plurality of wireless devices may include: sending a trigger frame indicating the assignment between each particular wireless device of the at least one wireless device and the set of resource units assigned to the particular wireless device; and receiving the data from each particular wireless device of the at least one wireless device on the set of resource units assigned to the particular wireless device.

The method may further include obtaining data to transmit in the first channel to at least one wireless device of the plurality of wireless devices, and the operation of assigning resource units may include: ordering the plurality of wireless devices according to the measure of signal strength corresponding to each of the wireless devices; and in descending order of the measure of signal strength corresponding to each of the wireless devices, assigning resource units furthest from a center frequency of the first frequency band to the at least one wireless device.

The method may further include narrowing a baseband filter for transmitting the data in the first channel to minimize interference with the second channel, and the operation of wherein communicating with the plurality of wireless devices may include transmitting the data to the at least one wireless device through the (narrowed) baseband filter.

The method may further include updating the measure of signal strength corresponding to each wireless device based on receiving transmissions from each wireless device. In this case, the updating the measure of signal strength may include saving a time-averaged value of the measure of signal strength.

In another form, an apparatus is provided comprising a first wireless network interface unit, a second wireless network interface unit, a memory, and a processor coupled to the memory and wireless network units. The first wireless network interface unit is configured to provide access to a wireless network over a first channel for a plurality of wireless devices. The second network interface unit is configured to provide access to the wireless network over a second channel for the plurality of wireless devices. The processor is configured to obtain a measure of signal strength corresponding to each wireless device in the plurality of wireless devices. The processor is also configured to assign for each wireless device, resource units with a first frequency band of the first channel to mitigate interference with a second frequency band of the second channel adjacent to the first channel. An assignment between a set of resource units and a particular wireless device is based on the measure of strength corresponding to the particular wireless device. The processor is further configured to cause the first wireless network interface unit to communicate with the plurality of wireless devices on the resource units.

In yet another form, a system is provided comprising a wireless network controller and an access point. The wireless network controller is configured to determine a first frequency band of a first channel in a wireless network and a second frequency band of a second channel in the wireless network. The first frequency band is adjacent to the second frequency band. The access point is configured to obtain a measure of signal strength corresponding to each wireless device of a plurality of wireless devices attached to the access point. The access point is also configured to assign for each wireless device, resource units within the first frequency band of the first channel to mitigate interference with the second frequency band of the second channel. An assignment between a set of resource units and a particular wireless device is based on the measure of signal strength corresponding to the particular wireless device. The access point is further configured to communicate with the plurality of wireless devices on the resource units.

In still another form, one or more non-transitory computer readable media is provided with instructions for a processor to carry out the processes described herein.

The above description is intended by way of example only. Various modifications and structural changes may be made therein without departing from the scope of the concepts described herein and within the scope and range of equivalents of the claims.

What is claimed is:

1. A method comprising:
obtaining a measure of signal strength corresponding to each wireless device of a plurality of wireless devices attached to an access point for a wireless network;
assigning for each wireless device, resource units within a first frequency band of a first channel to mitigate interference with a second frequency band of a second channel adjacent to the first channel by assigning resource units within the first frequency band closest to the second frequency band in descending order of the measure of signal strength such that a strongest wireless device with a highest corresponding measure of signal strength is assigned a first set of resource units closest to the second frequency band; and
communicating with the plurality of wireless devices on the resource units.

2. The method of claim 1, further comprising obtaining an indication that at least one wireless device has data to transmit to the access point on the first channel, and wherein assigning resource units further comprises ordering the plurality of wireless devices according to the measure of signal strength corresponding to each of the wireless devices.

3. The method of claim 2, wherein communicating with the plurality of wireless devices comprises:
sending a trigger frame indicating an assignment between each particular wireless device of the at least one wireless device and the set of resource units assigned to the particular wireless device; and
receiving the data from each particular wireless device of the at least one wireless device on the set of resource units assigned to the particular wireless device.

4. The method of claim 1, further comprising obtaining data to transmit in the first channel to at least one wireless device of the plurality of wireless devices, wherein assigning resource units comprises:
ordering the plurality of wireless devices according to the measure of signal strength corresponding to each of the wireless devices; and
in descending order of the measure of signal strength corresponding to each of the wireless devices, assigning resource units furthest from a center frequency of the first frequency band to the at least one wireless device.

5. The method of claim 4, further comprising narrowing a baseband filter for transmitting the data in the first channel to minimize interference with the second channel,
   wherein communicating with the plurality of wireless devices comprises transmitting the data to the at least one wireless device through the baseband filter.

6. The method of claim 1, further comprising updating the measure of signal strength corresponding to each wireless device based on receiving transmissions from each wireless device.

7. The method of claim 6, wherein updating the measure of signal strength comprises saving a time-averaged value of the measure of signal strength.

8. An apparatus comprising:
   a first wireless network interface unit to provide access to a wireless network over a first channel for a plurality of wireless devices;
   a second wireless network interface unit to provide access to the wireless network over a second channel for the plurality of wireless devices
   a memory; and
   a processor coupled to the memory, the first wireless network interface unit, and the second wireless network interface unit, wherein the processor is configured to:
      obtain a measure of signal strength corresponding to each wireless device of the plurality of wireless devices;
      assign for each wireless device, resource units within a first frequency band of the first channel to mitigate interference with a second frequency band of the second channel adjacent to the first channel by assigning resource units within the first frequency band closest to the second frequency band in descending order of the measure of signal strength such that a strongest wireless device with a highest corresponding measure of signal strength is assigned a first set of resource units closest to the second frequency band; and
      cause the first wireless network interface unit to communicate with the plurality of wireless devices on the resource units.

9. The apparatus of claim 8, wherein the processor is further configured to obtain an indication that at least one wireless device has data to transmit on the first channel, wherein the processor is configured to assign resource units by ordering the plurality of wireless devices according to the measure of signal strength corresponding to each of the wireless devices.

10. The apparatus of claim 9, wherein the first wireless network interface unit is configured to communicate with the plurality of wireless devices by:
   sending a trigger frame indicating an assignment between each particular wireless device of the at least one wireless device and the set of resource units assigned to the particular wireless device; and
   receiving the data from each particular wireless device of the at least one wireless device on the set of resource units assigned to the particular wireless device.

11. The apparatus of claim 8, wherein the processor is further configured to obtain data to transmit in the first channel to at least one wireless device of the plurality of wireless devices, and wherein the processor is configured to assign resource units by:
   ordering the plurality of wireless devices according to the measure of signal strength corresponding to each of the wireless devices; and
   in descending order of the measure of signal strength corresponding to each of the wireless devices, assigning resource units furthest from a center frequency of the first frequency band to the at least one wireless device.

12. The apparatus of claim 11, wherein the first wireless network interface unit is further configured to:
   narrow a baseband filter for transmitting the data in the first channel to minimize interference with the second channel; and
   communicate with the plurality of wireless devices by transmitting the data to the at least one wireless device through the baseband filter.

13. The apparatus of claim 8, wherein the processor is further configured to update the measure of signal strength corresponding to each wireless device based on receiving transmissions from each wireless device.

14. The apparatus of claim 13, wherein the processor is configured to update the measure of signal strength by saving a time-averaged value of the measure of signal strength in the memory.

15. A system comprising:
   a wireless network controller configured to determine a first frequency band of a first channel in a wireless network and a second frequency band of a second channel in the wireless network, wherein the first frequency band is adjacent to the second frequency band; and
   an access point configured to
      obtain a measure of signal strength corresponding to each wireless device of a plurality of wireless devices attached to the access point;
      assign for each wireless device, resource units within the first frequency band of the first channel to mitigate interference with the second frequency band of the second channel by assigning resource units within the first frequency band closest to the second frequency band in descending order of the measure of signal strength such that a strongest wireless device with a highest corresponding measure of signal strength is assigned a first set of resource units closest to the second frequency band; and
      communicate with the plurality of wireless devices on the resource units.

16. The system of claim 15, wherein the access point is further configured to obtain an indication that at least one wireless device has data to transmit on the first channel, wherein the access point assigns resource units by ordering the plurality of wireless devices according to the measure of signal strength corresponding to each of the wireless devices.

17. The system of claim 16, wherein the access point is configured to communicate with the plurality of wireless devices by:
   sending a trigger frame indicating an assignment between each particular wireless device of the at least one wireless device and the set of resource units assigned to the particular wireless device; and
   receiving the data from each particular wireless device of the at least one wireless device on the set of resource units assigned to the particular wireless device.

18. The system of claim 15, wherein the access point is further configured to obtain data to transmit in the first channel to at least one wireless device of the plurality of wireless devices, and wherein the access point is configured to assign resource units by:

ordering the plurality of wireless devices according to the measure of signal strength corresponding to each of the wireless devices; and in descending order of the measure of signal strength corresponding to each of the wireless devices, assigning resource units furthest from a center frequency of the first frequency band to the at least one wireless device.

19. The system of claim 18, wherein the access point is further configured to:

narrow a baseband filter for transmitting the data in the first channel to minimize interference with the second channel; and communicate with the plurality of wireless devices by transmitting the data to the at least one wireless device through the baseband filter.

20. The system of claim 15, wherein the wireless network controller is configured to determine the first frequency band and the second frequency band to be separated by guard band of frequencies based on the access point mitigating interference between the first channel and the second channel.

* * * * *